(12) United States Patent
Morita

(10) Patent No.: US 6,960,296 B2
(45) Date of Patent: Nov. 1, 2005

(54) OIL FILTER UNIT WITH DRAIN VALVE DEVICE

(75) Inventor: Shoji Morita, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 153 days.

(21) Appl. No.: 10/360,817

(22) Filed: Feb. 10, 2003

(65) Prior Publication Data

US 2003/0150787 A1 Aug. 14, 2003

(30) Foreign Application Priority Data

Feb. 12, 2002 (JP) ........................................ 2002-033396

(51) Int. Cl.[7] .............................................. B01D 35/16
(52) U.S. Cl. ........................ 210/234; 210/248; 210/443
(58) Field of Search ................................ 210/234, 248, 210/443

(56) References Cited

U.S. PATENT DOCUMENTS

| | | | |
|---|---|---|---|
| 4,906,365 A | | 3/1990 | Baumann et al. |
| 5,098,559 A | * | 3/1992 | Mack et al. ................. 210/130 |
| 5,468,386 A | * | 11/1995 | Ardes ......................... 210/248 |

FOREIGN PATENT DOCUMENTS

| | | | |
|---|---|---|---|
| DE | 19711457 | * | 10/1998 |
| GB | 2162079 | * | 1/1986 |
| JP | 2-2805 A | | 1/1990 |

* cited by examiner

Primary Examiner—Thomas M. Lithgow
(74) Attorney, Agent, or Firm—Foley & Lardner LLP

(57) ABSTRACT

An oil filter unit has a drain valve device. The valve comprises a retainer axially movably received in a cylindrical bore of a drain passage at a position upstream of a valve seat. The retainer has a valve member holding end. A valve member is axially movably received in the retainer in such a manner as to be movable between a closed position where the valve member closes a drain bore of the valve seat and an open position where the valve member opens the drain bore. A coil spring is arranged to bias the retainer relative to the valve seat in such a direction as to cause the valve member to take the open position. The retainer has a projected portion that projects into the interior of a filter housing. When a filter element is properly set in the filter housing, the projected portion is pressed down to shift the retainer to a position to allow the valve member to take the closed position.

17 Claims, 13 Drawing Sheets

OIL FILTER UNIT WITH DRAIN VALVE DEVICE

BACKGROUND OF INVENTION

1. Field of Invention

The present invention relates in general to oil filter units of motor vehicles, and more particularly to the oil filter units of a type that is equipped with a drain valve device for draining oil therefrom.

2. Description of Related Art

Hitherto, in the field of motor vehicles, various attempts have been made to reduce wastes for the purpose of protecting the environment. One of them is to change only a clogged filter element installed in an oil filter unit with a new one. In this case, it is necessary to drain a remaining oil from the filter unit before effecting change of the filter element. For this purpose, some of the conventional oil filter units are equipped with a drain valve device that is handled to drain the remaining oil as the need arises. Laid Open Japanese Patent Application (Tokkaihei) 2-2805 shows one of such oil filter units. That is, in the oil filter unit of this published Application, there is employed a drain valve device installed in an oil drain passage defined in the filter unit. The valve device generally comprises a valve seat defined by the oil drain passage that leads to a filter housing in which a filter element is installed, a valve member that is axially movably installed in the drain passage in a manner to open and close an opening formed in the valve seat thereby to open and close the drain passage, a first spring that is arranged to bias the valve member in a direction to close the opening of the valve seat and a second spring that is arranged to bias the valve member in a direction to open the opening of the valve seat. The spring constant of the first spring is greater than that of the second spring. When the filter element is properly set in the filter housing, a lower end of the same presses and thus compresses the first spring thereby forcing the valve member to close the opening of the valve seat against a counterforce of the second spring. While, when, for effecting a filter change, the filter element is removed from the filter housing, the biasing force of the first spring becomes zero thereby causing the valve element to open the opening of the valve seat with the aid of the biasing force of the second spring. In this open condition, the remaining oil in the filter housing can be drained freely therefrom.

SUMMARY OF INVENTION

However, in the known oil filter unit as mentioned hereinabove, it tends to occur that, even when the filter element is removed from the filter housing, the valve member is not detached or separated from the valve seat keeping the closed condition of the drain passage. This is because of the viscosity possessed by the degraded oil. That is, in such case, an adhesive force of the oil with which the valve member has been attached or stuck to the valve seat is deemed greater than a biasing force that is produced by a combination of first and second springs for biasing the valve member in the opening direction. This undesirable phenomenon tends to occur particularly when the second spring is kept compressed for a long time in degraded and heated oil.

Accordingly, an object of the present invention is to provide an oil filter unit of a type having a valve device installed therein, which is free of the above-mentioned drawbacks.

According to a first aspect of the present invention, there is provided an oil filter unit which comprises a filter housing comprising a housing proper and a lid member; a filter element received in the filter housing; a drain passage defined by the filter housing and connected with an interior of the filter housing; and a drain valve device that opens and closes the drain passage in response to detachment and attachment of the lid member from and to the housing proper, the drain valve device comprising a valve seat provided in the drain passage and having a drain bore formed therethrough; a retainer installed in the drain passage and axially movable in the same, the retainer having an oil flow passage formed therethrough; a valve member installed in the retainer, the valve member being movable to contact with the valve seat to close the drain bore; a first biasing member that biases the retainer away from the valve seat; and a structure that causes, upon attachment of the lid member to the housing proper, the retainer to move toward the valve seat thereby to induce a contact of the valve member with the valve seat due to an input force applied from the lid member against the biasing force of the first biasing member and causes, upon detachment of the lid member from the housing proper, the retainer to move away from the valve seat thereby to induce a separation of the valve member from the valve seat due to the biasing force of the first biasing member.

According to a second aspect of the present invention, there is provided an oil filter unit which comprises a filter housing comprising a housing proper and a lid member; a filter element received in the filter housing; a drain passage defined by the filter housing and connected with an interior of the filter housing; and a drain valve device that opens and closes the drain passage in response-to detachment and attachment of the lid member from and to the housing proper, the drain valve device comprising a valve seat provided in the drain passage and having a drain bore formed therethrough; a retainer installed in the drain passage and axially movable in the same, the retainer having an oil flow passage formed therethrough; a valve member installed in the retainer, the valve member being movable to contact with the valve seat to close the drain bore; a first biasing member that biases the retainer away from the valve seat; a second biasing member that biases the valve member toward the valve seat; and a structure that causes, upon attachment of the lid member to the housing proper, the retainer to move toward the valve seat thereby to induce a contact of the valve member with the valve seat due to an input force applied from the lid member against the biasing force of the first biasing member and causes, upon detachment of the lid member from the housing proper, the retainer to move away from the valve seat thereby to induce a separation of the valve member from the valve seat due to the biasing force of the first biasing member.

According to a third aspect of the present invention, there is provided an oil filter unit which comprises a filter housing comprising a housing proper and a lid member; a filter element received in the filter housing; a drain passage defined by the filter housing and connected with an interior of the filter housing; and a drain valve device that opens and closes the drain passage in response to detachment and attachment of the lid member from and to the housing proper, the drain valve device comprising a valve seat provided in the drain passage and having a drain bore formed therethrough; a retainer installed in the drain passage and axially movable in the same, the retainer having an oil flow passage formed therethrough; a valve member installed in the retainer, the valve member being movable to contact with the valve seat to close the drain bore; a first biasing member that biases the retainer away from the valve seat;

and a structure that causes, upon attachment of the lid member to the housing proper, the retainer to move toward the valve seat thereby to induce a contact of the valve member with the valve seat due to an input force applied from the lid member against the biasing force of the first biasing member and causes, upon detachment of the lid member from the housing proper, the retainer to move away from the valve seat thereby to induce a separation of the valve member from the valve seat due to the biasing force of the first biasing member, wherein the retainer is formed with a tool inserting through bore through which a press rod is insertable for pushing the valve member toward the valve seat.

Other objects and advantages of the present invention will become apparent from the following description when taken in conjunction with the accompanying drawings.

DETAILED DESCRIPTION OF EMBODIMENTS

Figure 1:
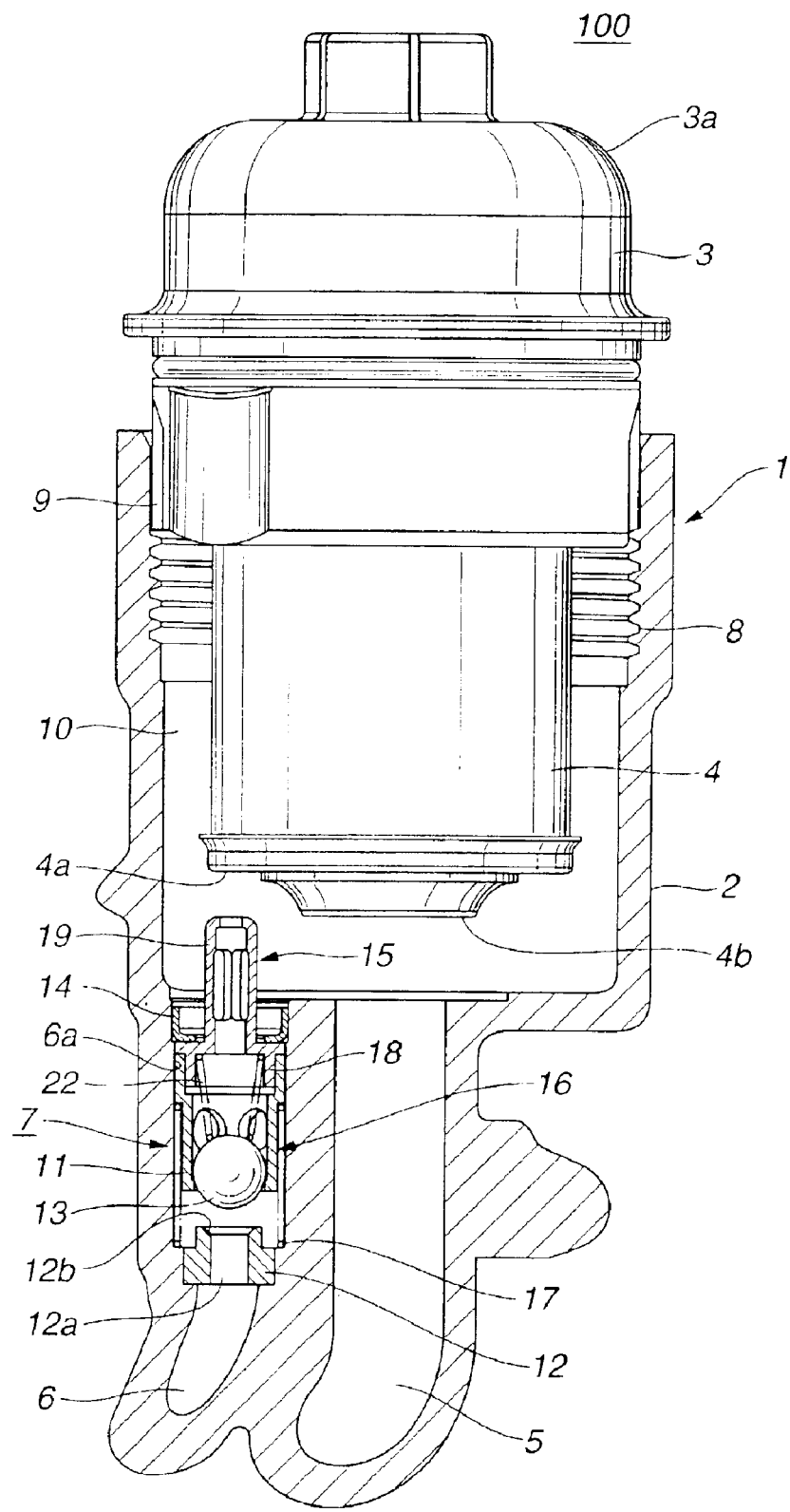
FIG. 1 is a partially sectional view of an oil filter unit that is a first embodiment of the present invention.
Figure 2:
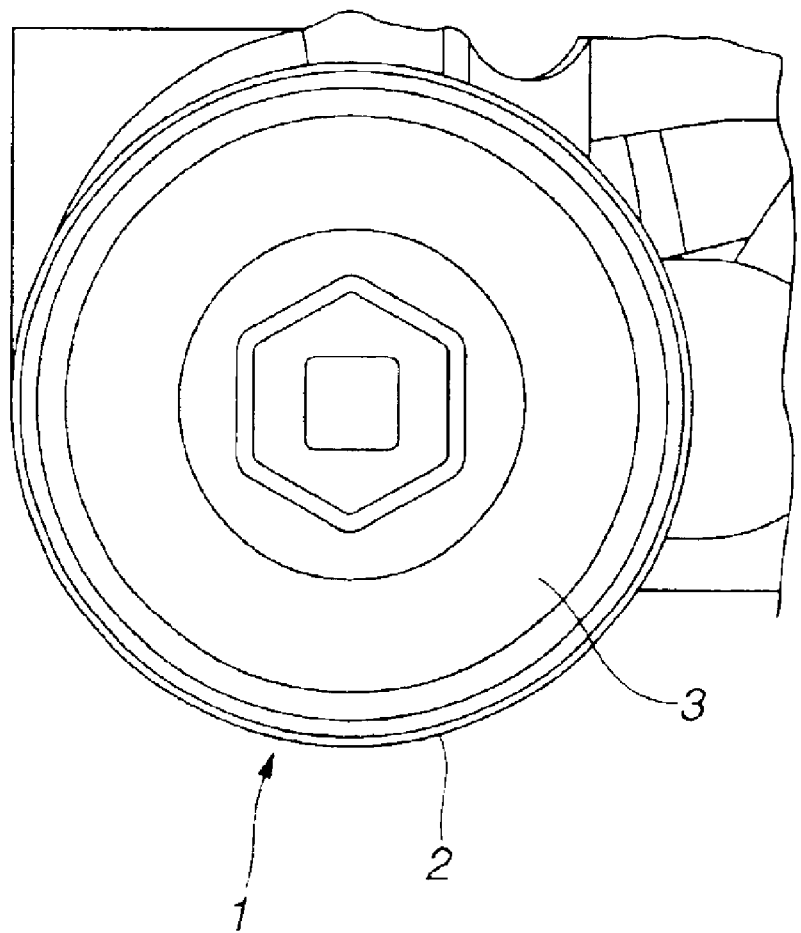
FIG. 2 is a plan view of the oil filter unit of the first embodiment.

In the following, four embodiments 100, 200, 300 and 400 will be described in detail with reference to the accompanying drawings.

Throughout the specification, substantially same parts and portions are denoted by the same reference numerals for facilitation of description, and for ease of understanding, various directional terms, such as, right, left, upper, lower, rightward and the like are used in the description. However, such terms are to be understood with respect to a drawing or drawings on which a corresponding part or portion is illustrated.

Referring to FIGS. 1 to 8, particularly FIGS. 1 to 5, there is shown an oil filter unit 100 which is a first embodiment of the present invention.

Although not shown in the drawings, oil filter unit 100 is mounted to a given portion of an internal combustion engine or the like for the purpose of cleaning or filtering a lubrication oil that flows in the engine to lubricate various movable parts of the engine.

Figure 4:
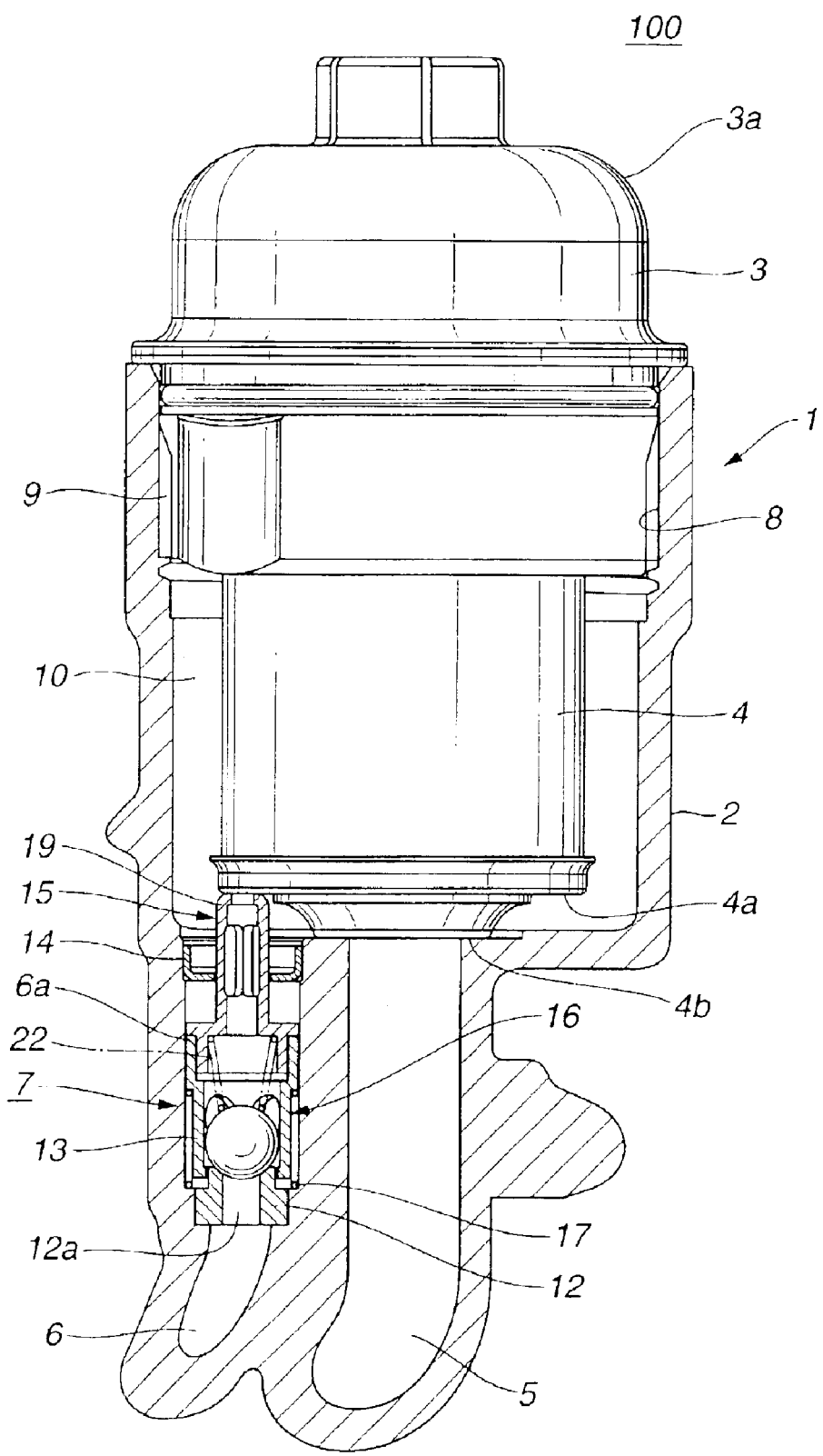
FIG. 4 is a view similar to FIG. 1, but showing a condition wherein a filter element is properly set in a filter housing.

As is best seen from FIGS. 1 and 4, oil filter unit 100 of the first embodiment comprises a filter housing 1 that includes a generally cylindrical housing proper 2 and a circular lid member 3 screwed into an upper part of housing proper 2. A cylindrical filter element 4 is installed in filter housing 1 in a manner to define a cylindrical space 10 between a cylindrical outer surface of filter element 4 and a cylindrical inner surface of housing proper 2. As shown, housing proper 2 has a lower part that has both an inlet passage (not shown) connected to the cylindrical space 10 and an outlet passage 5 connected to an interior of filter element 4. The inlet passage and outlet passage 5 extend in parallel with each other. In operation of an associated engine, lubrication oil is led into the cylindrical space 10 through the inlet passage and led into the interior of filter element 4 while being filtered or cleaned by the same. The cleaned lubrication oil in filter element 4 is then led to various portions of the engine through outlet passage 5.

It is to be noted that FIG. 1 shows a condition wherein filter element 4 is incompletely set in housing proper 2 and FIG. 4 shows a condition wherein filter element 4 is properly set in housing proper 2.

As shown in the drawings, a drain passage 6 is further formed in the lower part of housing proper 2, which extends in parallel with outlet passage 5. Drain passage 6 has an upper end exposed to cylindrical space 10 and a lower end exposed to an oil pan (not shown) of the engine. Within drain passage 6, there is installed a drain valve device 7. As will be described in detail hereinafter, drain passage 6 has a part that is formed into a cylindrical bore 6a that is incorporated with drain valve device 7.

The housing proper 2 has at an upper portion thereof an internal thread 8 and in a lower portion thereof the above-mentioned inlet and outlet passages 5 and drain passage 6.

The lid member 3 has a cup-shaped upper part 3a and has at its lower part an external thread 9 that is operatively engaged with an internal thread 8 of housing proper 2. Although not shown in the drawings, lid member 3 has a flat surface that faces downward. The flat surface is used for evenly pressing an upper flat part of filter element 4 to achieve a stable and proper setting of the same in housing proper 2. That is, as is seen from FIG. 4, upon proper setting, filter element 3 is sandwiched between the flat surface of lid member 3 and a flat bottom surface of the bore of housing proper 2. In this condition, an opening formed in a bottom part of filter element 3 is connected with the above-mentioned outlet passage 5 to establish a fluid connection between the interior of filter element 3 and outlet passage 5. For achieving sealing between the opening of filter element 3 and the flat bottom surface of the bore, an annular sealing member 4b is attached or applied to the bottom part of filter element 3.

As is seen from FIG. 1, filter element 4 comprises a cylindrical filter proper whose outer diameter is smaller than an inner diameter of housing proper 2 for defining therebetween the above-mentioned cylindrical space 10.

Figure 3:
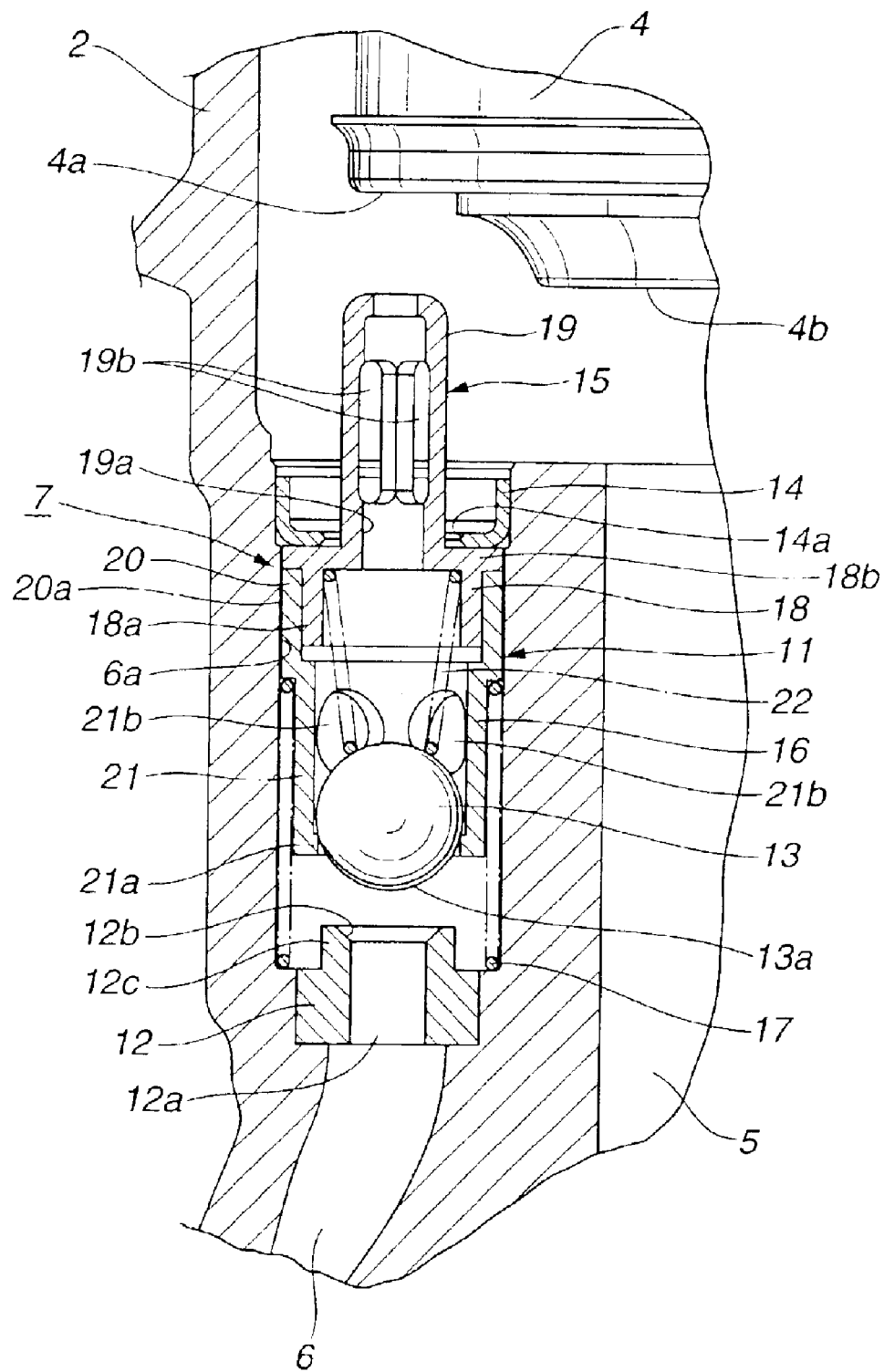
FIG. 3 is an enlarged sectional view of a drain valve device employed in the oil filter unit of the first embodiment.

As is well shown in FIG. 3, drain valve device 7 comprises a cylindrical retainer 11 that is axially slidably received in the above-mentioned cylindrical bore 6a that constitute part of drain passage 6. A valve seat 12 is tightly set in a lower end of cylindrical bore 6a. More specifically, valve seat 12 is press-fitted in a stepped bore provided at the lower end of cylindrical bore 6a. A valve ball 13 made of metal is held on a lower end of cylindrical retainer 11, that can be seated on valve seat 12 in an after-mentioned manner. An annular stopper 14 is press-fitted in an upper end of cylindrical bore 6a for determining an uppermost position of cylindrical retainer 11.

The cylindrical retainer 11 comprises a cylindrical projected member (or supported member) 15 whose upper end is contactable with a bottom surface 4a of filter element 4 and a cylindrical base member (or supporting member) 16 that is coupled with cylindrical projected member 15. These two members 15 and 16 are constructed of a metal.

A coil spring 17 (or first spring) is compressed between the bottom of cylindrical bore 6a and a stepped part of cylindrical base member 16 to bias cylindrical retainer 11 upward, that is, in a direction to separate valve ball 13 from valve seat 12. As is seen from the drawing, coil spring 17 is neatly received in a cylindrical clearance (no numeral) defined between a cylindrical inner surface of cylindrical bore 6a and an after-mentioned smaller diameter lower portion 21 of cylindrical base member 16.

The cylindrical projected member 15 comprises a cylindrical base portion (or first engaging portion) 18 that is fitted in an upper part of cylindrical base member 16 and a cylindrical projected portion 19 that projects upward from cylindrical base portion 18. Cylindrical base portion 18 comprises a cylindrical part 18a that is fitted in the upper part of cylindrical base member 16 and an annular upper wall 18b that is integral with an upper end of cylindrical part 18a. As shown, annular upper wall 18b has a periphery slidably contacting with the inner surface of cylindrical bore 6a. Cylindrical projected portion 19 projects upward through a center opening 14a of annular stopper 14 fitted in the upper end of cylindrical bore 6a. As shown, cylindrical projected portion 19 is formed with an axially extending through bore 19a. As will be described in detail hereinafter, the through bore 19a is used for inserting therein a tool. A plurality of axially extending grooves 19b are formed on an outer surface of cylindrical projected portion 19, through which the lubrication oil in housing proper 2 is led into cylindrical retainer 11.

The cylindrical base member 16 comprises a larger diameter upper portion (or second engaging portion) 20 and a smaller diameter lower portion 21 between which there is defined a stepped portion. Larger diameter upper portion 20 has an outer cylindrical surface 20a slidably contacting with the inner surface of cylindrical bore 6a. As shown, larger diameter upper portion 20 has cylindrical part 18a of cylindrical projected member 15 fitted therein. While, smaller diameter lower portion 21 is integrally formed at its lower end with an annular ring part 21a that projects inward. As shown, ring part 21a is so sized as to hold valve ball 13 permitting a part 13a of the same to project downward therefrom. Furthermore, smaller diameter lower portion 21 is formed at its cylindrical wall with a plurality of openings 21b for allowing flow of the lubrication oil from the interior of cylindrical retainer 11 to the outside of the same.

The valve seat 12 is generally cylindrical in shape and formed with a drain bore 12a through which the lubrication oil in the drain valve device 7 flows downward in drain passage 6. An upper end of drain bore 12a is tapered to have a concave seat portion 12b. An upper portion 12c of valve seat 12 is shaped smaller in diameter.

The valve ball 13 is constructed of a metal. The hardness of valve ball 13 is sufficiently higher than that of valve seat 12. As shown, valve ball 13 is slidably received in lower portion 21 of cylindrical base member 16 of cylindrical retainer 11.

A conical spring 22 (or second spring) is compressed between an upper wall 18b of cylindrical retainer 11 and valve ball 13 to bias valve ball 13 downward, that is, in a direction to press valve ball 13 against annular ring part 21a of lower portion 21 of cylindrical retainer 11.

It is to be noted that conical spring 22 is set to bias valve ball 13 with a small biasing force with respect to the biasing force produced by coil spring 17.

The annular stopper 14 is shaped like a cup and has a cylindrical wall press-fitted in the upper end of the cylindrical bore 6a. Center opening 14a of annular stopper 14 is so sized to smoothly guide the axial movement of cylindrical projected portion 19 therethrough.

As has been mentioned hereinabove, coil spring 17 is compressed between the stepped portion of cylindrical base member 16 and the bottom of cylindrical bore 6a to bias cylindrical retainer 11 upward.

It is to be noted that under proper setting of filter element 4 in filter housing 2, coil spring 17 biases cylindrical retainer 11 with a biasing force that is sufficiently larger than that of the above-mentioned conical spring 22.

Figure 7:
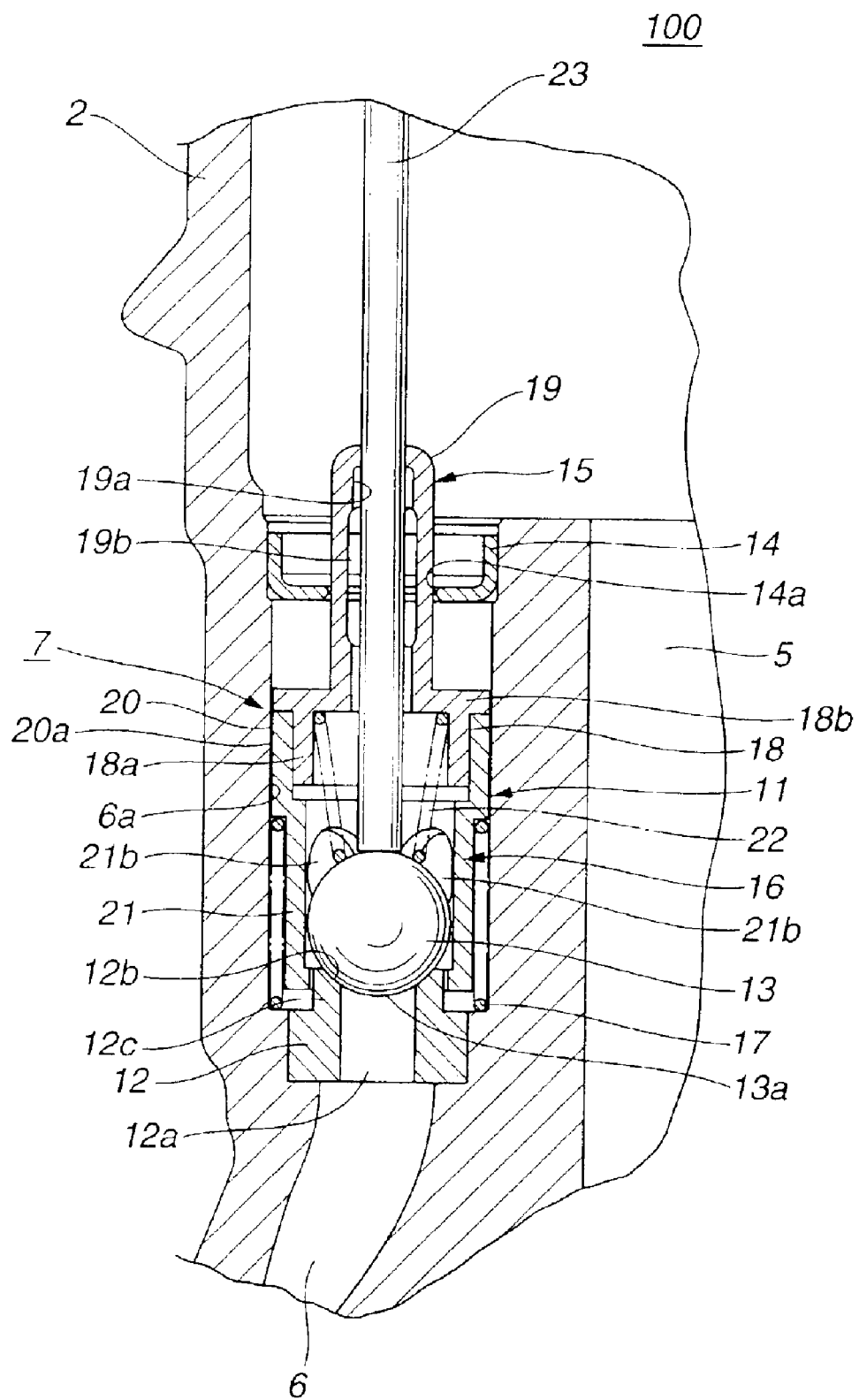
FIG. 7 is a view similar to FIG. 6, but showing a second step for the shaping of the valve seat portion.
Figure 8:
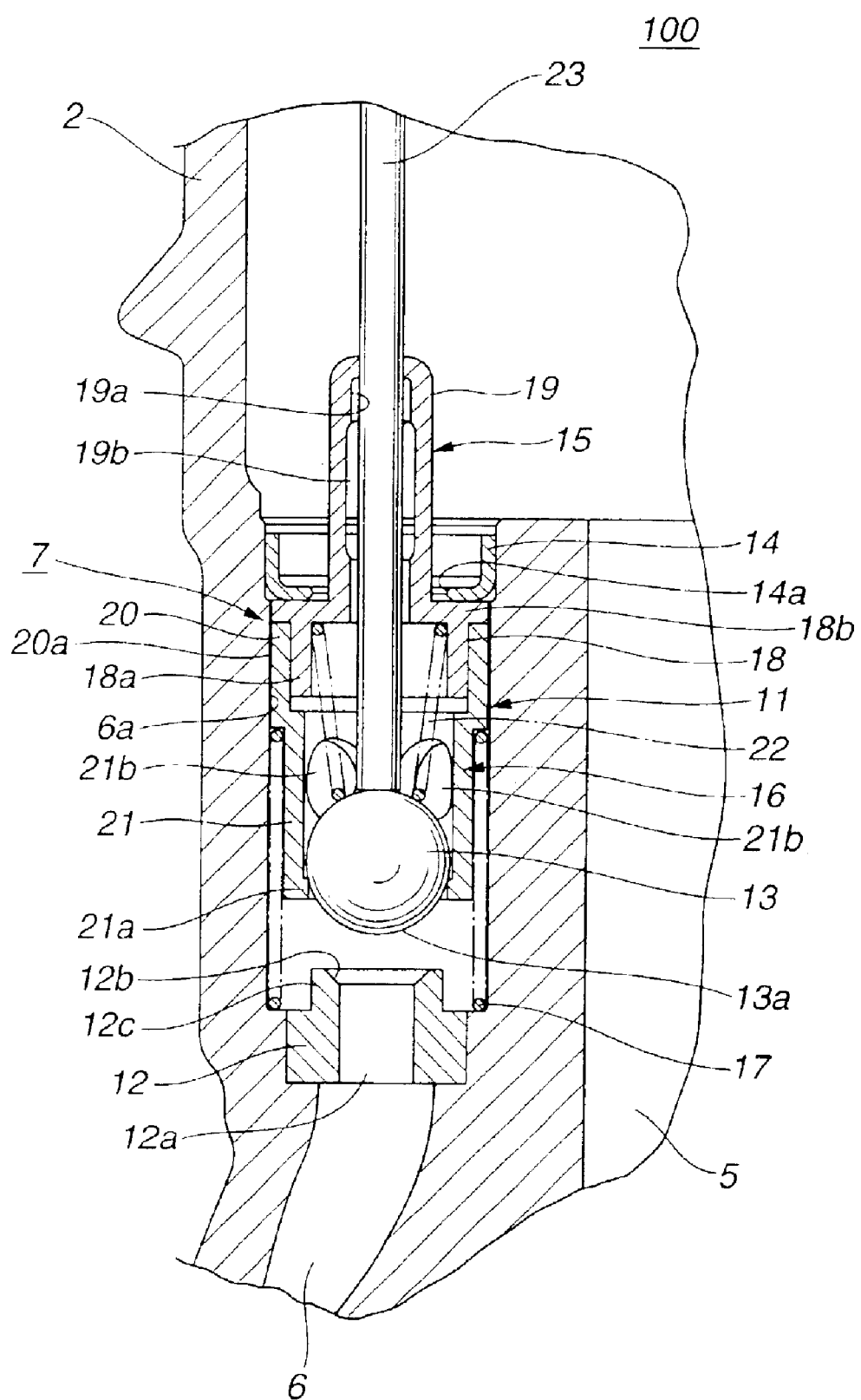
FIG. 8 is a view similar to FIG. 6, but showing a third step for the shaping of the valve seat portion.

In the following, a unique method for providing valve seat 12 with concave seat portion 12b will be described with reference to FIGS. 6 to 8.

Figure 6:
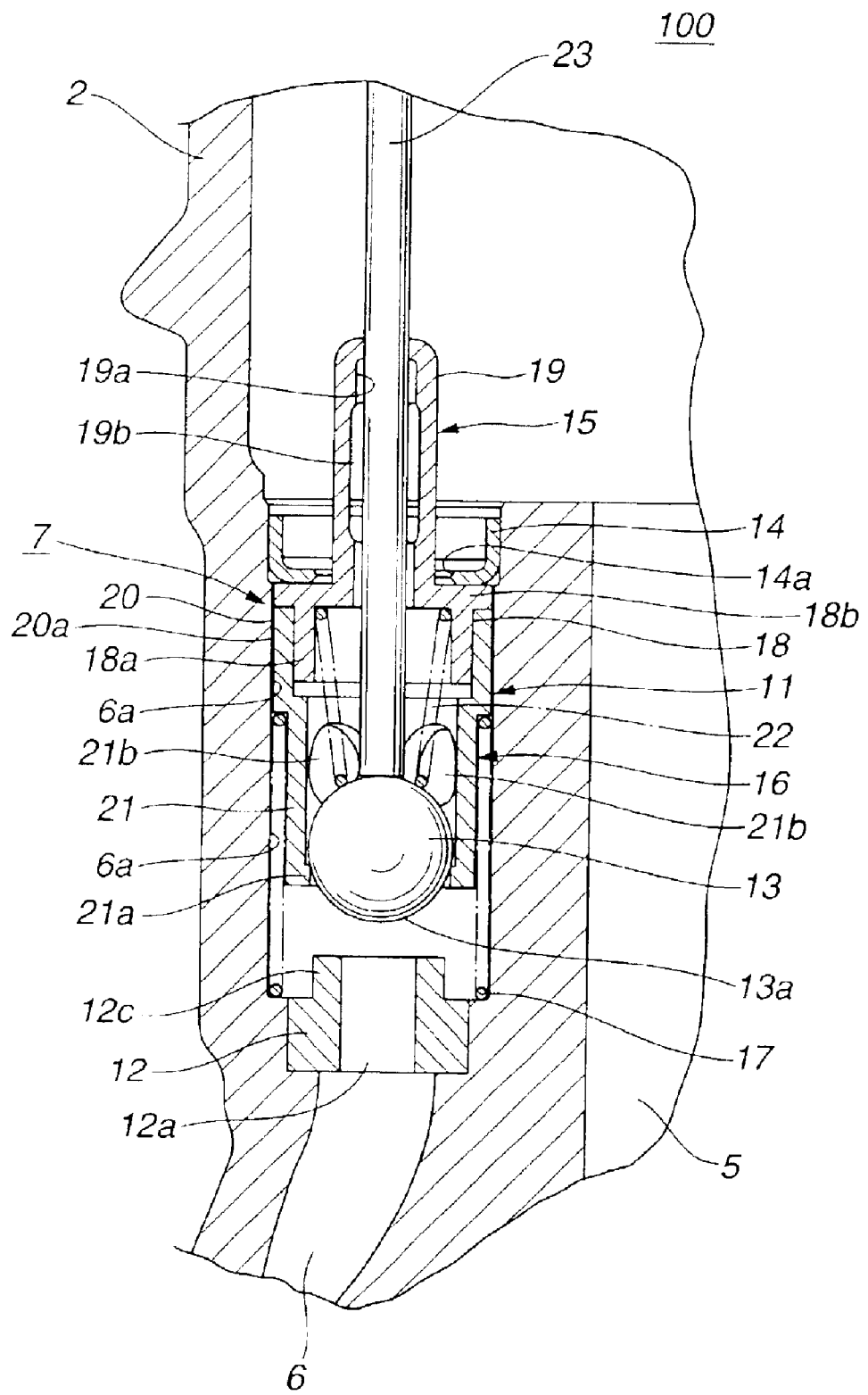
FIG. 6 is a view similar to FIG. 3, but showing a first step for shaping a valve seat portion on a valve seat.

That is, as is seen from FIG. 6, before carrying out the method, all parts of drain valve device 7 should be properly set in the cylindrical bore 6a of drain passage 6, as shown in the drawing.

First, a tool, viz., a press rod 23, is put down into cylindrical retainer 11 through bore 19a of cylindrical projected portion 19. Then, press rod 23 is handled to push the valve ball 13 downward with a certain force. With this, as is seen from FIG. 7, entire construction of cylindrical retainer 11 is moved down against the biasing force of coil spring 17 to a lower position where the projected part 13a of valve ball 13 contacts the upper end of valve seat 12. Under this condition, as is seen from the drawing, there is remained a certain space below the leading end of smaller diameter lower portion 21 of cylindrical retainer 11. Then, a certain big force is applied downward to press rod 23. With this, with a slight downward shifting of cylindrical retainer 11, the projected part of valve ball 13 is strongly pressed against the upper end of valve seat 12 thereby to form a concave seat portion 12b on valve seat 12, as is seen from FIG. 8. Due to this method, the seat portion 12b has a concave surface whose radius of curvature is substantially the same as that of valve ball 13. Of course, upon completion of formation of seat portion 12b, the tool, viz., the press rod 23 is removed from the oil filter unit 100.

If desired, an annular tapered recess may be previously provided at the upper end of drain bore 12a of valve seat 12 before pressing the upper end of drain bore 12a with valve ball 13. In this case, valve ball 13 can be easily and precisely positioned by the annular tapered recess, and thus, the seat portion 12b can be precisely produced.

As is understood from the above, concave seat portion 12b of valve seat 12 is easily produced by handling the simple tool 23, which brings about a reduction in cost of the oil filter unit 100. Furthermore, the seat portion 12b has concave surface whose radius of curvature is substantially the same as that of valve ball 13. This brings about an adequate sealing between seat portion 12b and valve ball 13 when a contact is effected therebetween.

In the following, operation of oil filter unit 100 will be described with the aid of the drawings.

Figure 5:
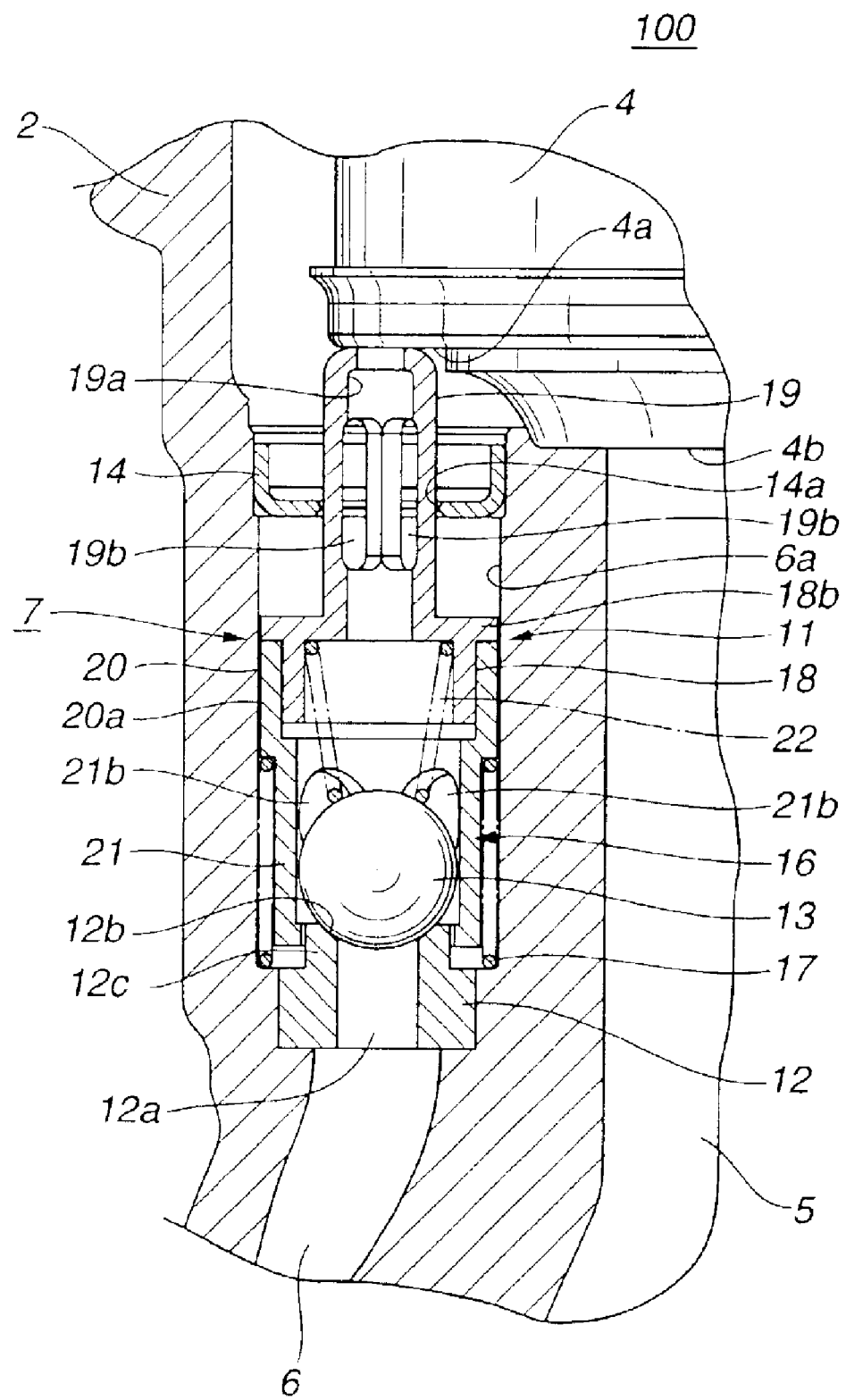
FIG. 5 is a view similar to FIG. 3, but showing a condition wherein the filter element is properly set in the filter housing.

For ease of understanding, the description will be commenced with respect to a normal condition of the oil filter element 100 as is shown in FIGS. 4 and 5.

Under this normal condition, lid member 3 is properly put on housing proper 2, and thus filter element 4 is tightly sandwiched between the flat bottom surface of the bore of housing proper 2 and the flat surface of lid member 3, as is seen from FIG. 4.

Furthermore, under this condition, as is seen from FIG. 5, projected portion 19 of cylindrical retainer 11 is kept pressed down by bottom surface 4a of filter element 4 against the force of coil spring 17. Because of provision of the space that is remained below the leading end of smaller diameter lower portion 21 of cylindrical retainer 11, downward movement of the cylindrical retainer 11 toward its lowermost position is smoothly made. As shown in FIG. 5, under this condition, valve ball 13 is hermetically seated on tapered seat portion 12b of valve seat 12 thereby to close drain bore 12a, viz., drain passage 6. Because of function of conical spring 22, a certain biasing force is applied to valve ball 13 thereby to assure the hermetical sealing between valve ball 13 and seat portion 12b.

Thus, as is understood from FIG. 4, under this condition wherein drain passage 6 is blocked, the lubrication oil from an associated engine is led into cylindrical clearance 10 through the inlet passage (not shown) and led into the interior of filter element 4 while being filtered or cleaned by the same. The cleaned lubrication oil in filter element 4 is led into outlet passage 5 and led to various portions of the engine where lubrication is needed.

When, now, due to need of changing of filter element 4 with a new one, lid member 3 is turned in a direction to be loosed and turned further, the same is gradually moved away from housing proper 2. Due to this movement of lid member 3, projected portion 19 of cylindrical retainer 11 is gradually projected into the bore of housing proper 2 by the force of coil spring 17. When the movement of lid member 3 exceeds a certain degree as shown in FIG. 1, projected portion 19 is fully projected into the bore of housing proper 2. Under this condition, the grooves 19b of projected portion 19 are exposed to the bottom of the bore of housing proper 2 and at the same time, valve ball 13 is separated from seat portion 12b of valve seat 12. Upon this, drain passage 6 is opened, and thus, the lubrication oil remained in housing proper 2 is forced to flow into drain passage 6 through the through bore 19a, grooves 16b, the interior of cylindrical retainer 11, openings 21b, the lower portion of cylindrical bore 6a and drain bore 12a. The oil in drain passage 6 is then led into the oil pan of the engine. Thereafter, the old filter element 4 is replaced with new one. Because the remaining lubrication oil in filter element 4 and housing proper 2 is sufficiently drained as is described hereinabove, the old filter element 4 can be easily handled without dirtying surrounding parts of oil filter unit 100.

As is understood from the above, for opening or lifting valve ball 13 from valve seat 12 upon separation of filter element from housing proper 2, there is used the coil spring 17 that functions to force valve ball 13 to separate from valve seat 12. Accordingly, even if the adhesive force of the lubrication oil functions to attach valve ball 13 to valve seat 12, the higher biasing force of coil spring 17 induces an assured separation of the valve ball 13 from valve seat 12 against the adhesive force.

In oil filter unit 100, upon separation of lid member 3 from housing proper 2, coil spring 17 is permitted to sufficiently expand thereby to largely shift valve ball 13 away from valve seat 12 providing a sufficient space between valve ball 13 and valve seat 12 as is seen from FIG. 3. Due to provision of such sufficient space, oil discharge from housing proper 2 is smoothly and quickly made.

Because of function of coil spring 17 that constantly biases, through projected member 15, the filter element 4 upward when the filter element 4 is normally set in housing proper 2, the work for removing lid member 3 and filter element 4 from housing proper 2 is easily made.

Due to provision of conical spring 22 that constantly presses valve ball 13 against valve seat 12 when filter element 4 is normally set in housing proper 2, valve ball 13 can be stably set on seat portion 12b of valve seat 12. Thus, even when oil filter unit 100 is mounted to the engine with a certain inclination relative to a direction of gravity, the closed condition of drain valve device 7 is assuredly kept.

Because concave seat portion 12b of valve seat 12 can be directly shaped by valve ball 13, the hermetical contact therebetween is appropriately made, which induces an improved sealing therebetween.

The valve ball 13 is pressed downward by only conical spring 22 whose biasing force is sufficiently smaller that that produced by coil spring 17. Thus, valve ball 13 may have a less strength. Because valve ball 13 is spherical in shape, it shows an improved hermetical contact against concave seat portion 12b of valve seat 12, which promotes the improved sealing therebetween. Furthermore, for the same reason, valve ball 13 may have a smaller size.

The valve ball 13 has a hardness higher than that of valve seat 12. Thus, shaping of seat portion 12b is smoothly achieved without inducing deformation of valve ball 13. Furthermore, even if a displacement of valve ball 13 takes place upon being set on valve seat 12, the smoothly curved seat portion 12b of valve seat 12 instantly induce a proper mating with valve ball 13.

Because cylindrical retainer 11 has the axially extending larger diameter upper portion 20 that slidably contacts with the inner surface of cylindrical bore 6a, movement of cylindrical retainer 11 in cylindrical bore 6a is smoothly achieved.

The coil spring 17 is neatly received in the cylindrical clearance defined between the cylindrical inner surface of cylinder bore 6a and the smaller diameter lower portion 21 of cylindrical base member 16. Thus, coil spring 17 is stably held even when compressed, and thus, stable biasing force can be applied to cylindrical retainer 11.

Due to provision of annular stopper 14 fitted in the upper end of cylindrical bore 6a, upward movement of cylindrical retainer 11 is assuredly restricted. Because of a split construction of cylindrical retainer 11 that includes cylindrical projected member 15 and cylindrical base member 16, valve ball 13 can be readily set in cylindrical retainer 11.

Due to provision of grooves 19b on the outer surface of cylindrical projected portion 19, oil discharging from the interior of housing proper 2 toward drain passage 6 is smoothly and quickly made. In this embodiment 100, movement of cylindrical retainer 11 is induced through the movement of filter element 4. Thus, there is no need of using a long spring as the spring 17.

Figure 9:
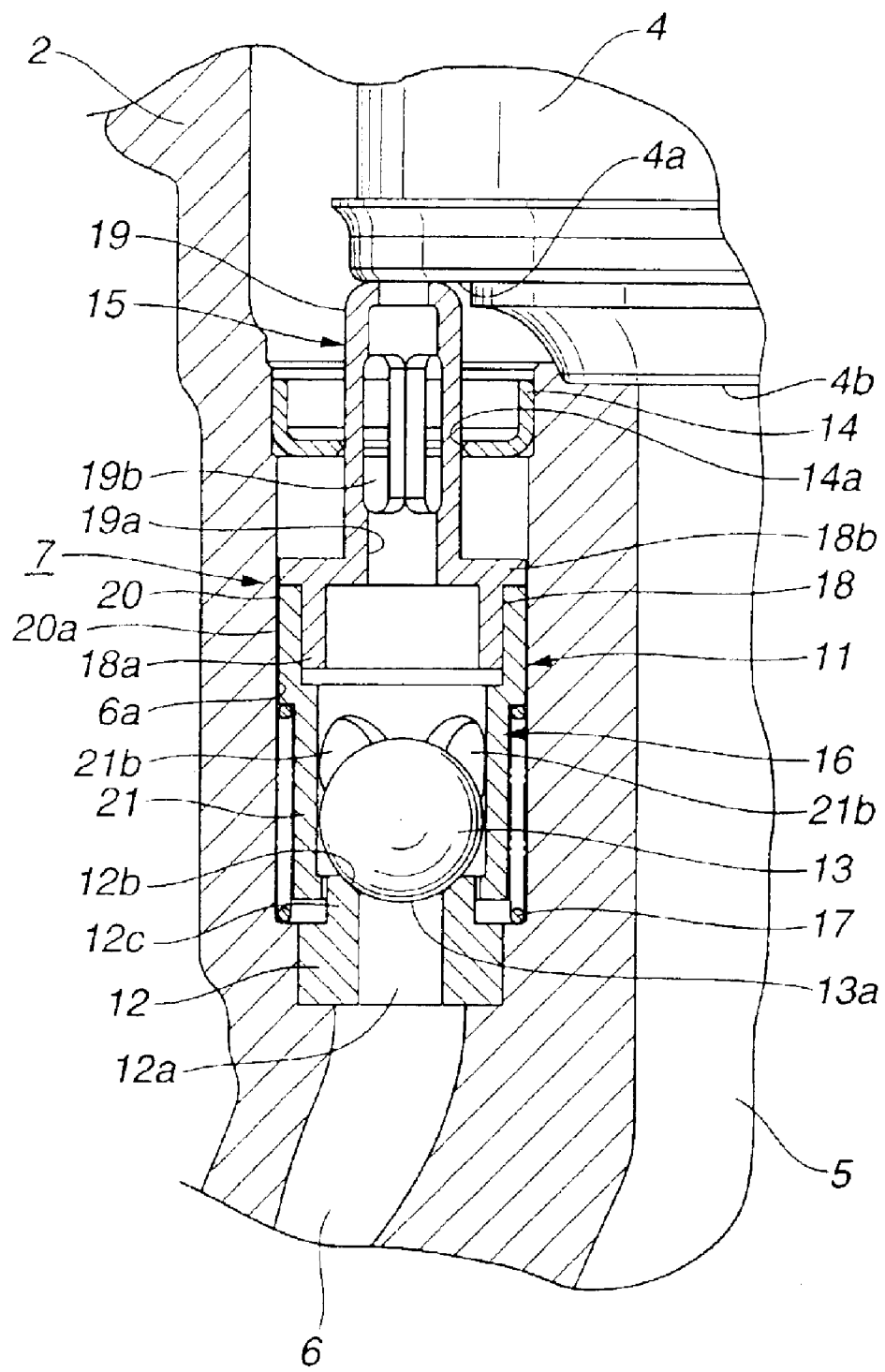
FIG. 9 is a view similar to FIG. 3, but showing a drain valve device employed in a second embodiment of the present invention.

Referring to FIG. 9, there is shown but partially an oil filter unit 200 which is a second embodiment of the present invention.

Since this embodiment 200 is similar to the above-mentioned first embodiment 100, only parts or portions that are different from those of the first embodiment 100 will be described in detail in the following.

In this second embodiment 200, there is no means that corresponds to the conical spring (22) used in the first embodiment 100. That is, in this second embodiment 200, valve ball 13 is hermetically seated on seat portion 12b of valve seat 12 by its own weight and weight of lubrication oil in retainer 20. Due to reduction of parts, cost of oil filter unit is reduced.

Figure 10:
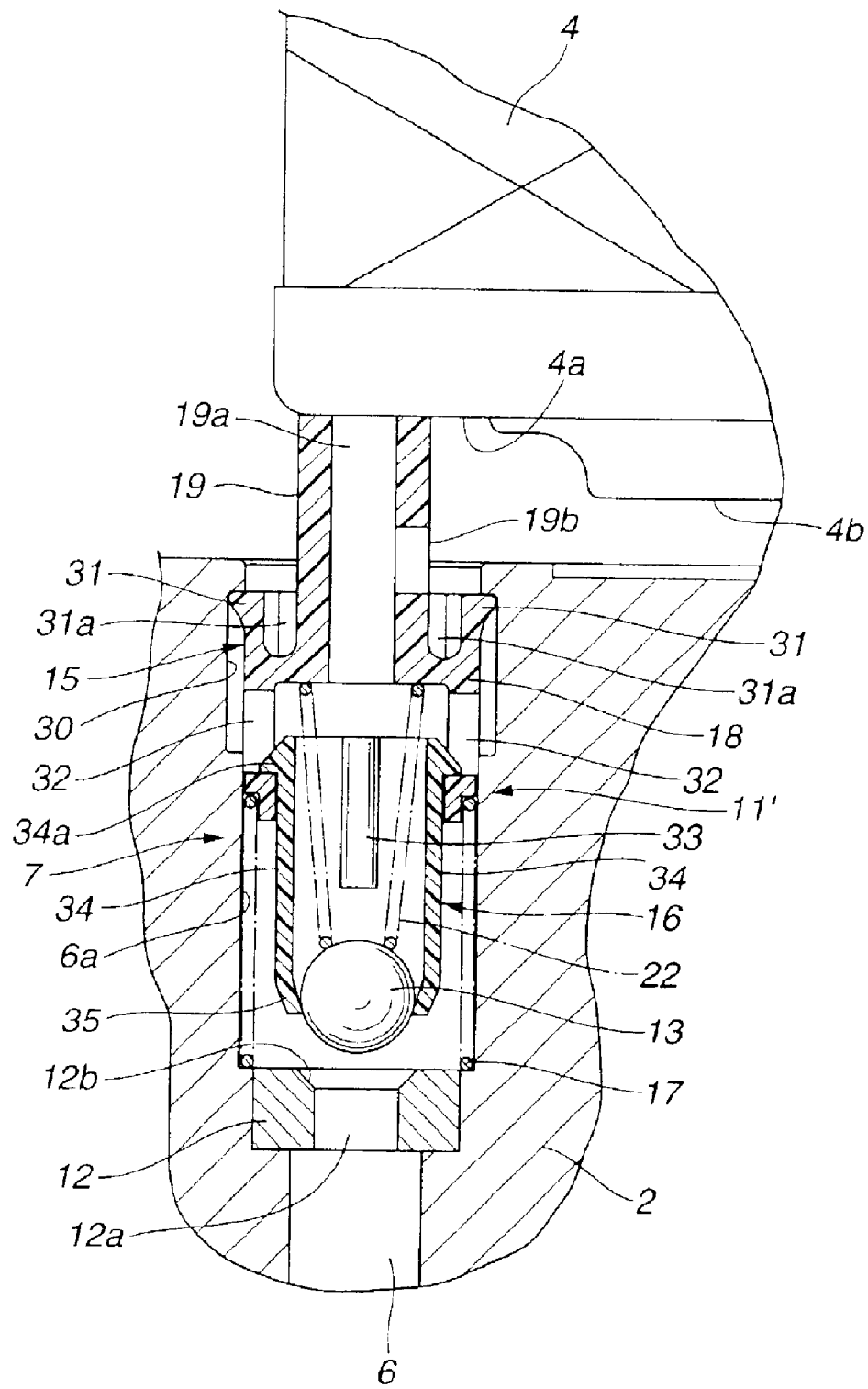
FIG. 10 is a view similar to FIG. 3, but showing a drain valve device employed in a third embodiment of the present invention.
Figure 11:
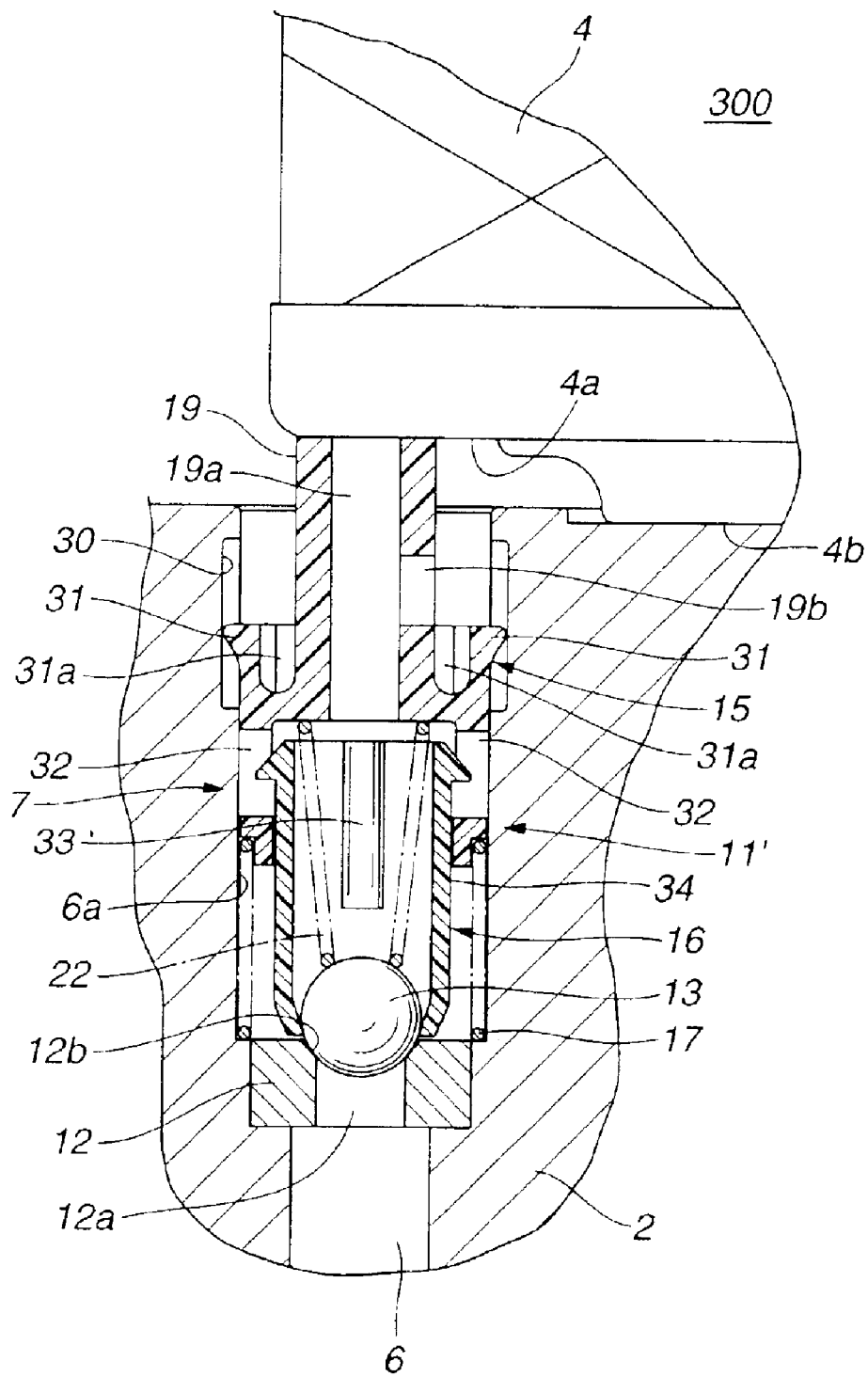
FIG. 11 is a view similar to FIG. 10, but showing a condition wherein a filter element is properly set in a filter housing.

Referring to FIGS. 10 and 11, there is shown but partially an oil filter unit 300 which is a third embodiment of the present invention.

In this third embodiment 300, a cylindrical projected member 15 of a cylindrical retainer 11' and a cylindrical base member 16 of the same are constructed of a plastic, and these two members 15 and 16 are axially movably connected to each other.

That is, at an upper end portion of cylindrical bore 6a, there is defined an annular groove (or engaging groove) 30. Base portion 18 of cylindrical projected member 15 is axially movably received in annular groove 30. More specifically, base portion 18 is formed with equally spaced slide pawls 31 which are in contact with a cylindrical inner wall of annular groove 30. Furthermore, base portion 16 is formed at its upper portion with a plurality of slits 31a for providing slide pawls 31 with a suitable resiliency. Furthermore, below slide pawls 31, base portion 18 is formed with a plurality of grooves 32 that are spaced at equally spaced intervals. Furthermore, base portion 18 is formed at a lower end thereof with a stepped spring seat against which an upper end of coil spring 17 abuts, as shown. Cylindrical projected portion 19 projected upward from base portion 18 is cylindrical in shape having an axially extending through bore 19a. As has been mentioned hereinabove, the through bore 19a is used for inserting therein a tool. At least one opening 19b is formed in the cylindrical wall of cylindrical projected portion 19, through which the lubrication oil in housing proper 2 (see FIG. 1) can be led into cylindrical retainer 11' as the need arises.

The cylindrical base member 16 of cylindrical retainer 11' is formed at its upper portion with equally paced slits 33 each extending axially. Between neighboring slits 33, there are defined engaging pawls 34 which have at upper ends thereof engaging hooks 34a slidably engaged with grooves 32 of the above-mentioned base portion 18. These engaging pawls 34 are formed with inwardly bent lower ends 35 for holding valve ball 13. Within cylindrical base member 16, there is installed a conical spring 22 for biasing valve ball 13 downward. More specifically, conical spring 22 is compressed between the above-mentioned base portion 18 and valve ball 13. At a lower end of cylindrical bore 6a, there is fixed a valve seat 12 that has a seat portion 12b for valve ball 13.

In the following, steps for assembling drain valve device 7 in cylindrical bore 6a will be described with the aid of the drawings.

First, the drain valve device 7 is previously assembled in an open space in the following manner.

That is, the parts of the drain valve device 7 are prepared, which are cylindrical projected member 15, cylindrical base member 16, coil spring 17, conical spring 22 and valve ball 13. Valve ball 13 is put into cylindrical base member 16 from the upper open end of the member 16. Then, conical spring 22 is put into the base member 16. Then, with conical spring 22 kept in the base member 16, engaging hooks 34a of the base member 16 are thrust into base portion 18 of cylindrical projected member 15 from the open lower end of the member 15. With this thrust action, engaging hooks 34a are brought into engagement with grooves 32 of base portion 18 of the cylindrical projected member 15, as is understood from FIG. 10. Under this condition, conical spring 22 is compressed to bias valve ball 13 downward. Furthermore, due to the biasing force of coil spring 22, base member 16 is forced to take a remote position relative to cylindrical projected member 15, where engaging hooks 34a abut on lower ends of grooves 32 of cylindrical projected member 15. In other words, the sub-assembled drain valve device 7 assumes its longer size.

Then, after inserting coil spring 17 into cylindrical bore 6a, the sub-assembled valve device 7 is put into cylindrical bore 6a while compressing coil spring 17. During this, slide pawls 31 of cylindrical projected member 15 are inwardly pressed by a diametrically reduced upper open portion of cylindrical bore 6a, and when the insertion of the sub-assembled valve device 7 into cylindrical bore 6a exceeds a certain degree, slide pawls 31 are resiliently expanded radially outward to engage with annular groove 30 in a snap action manner. With this, cylindrical retainer 11' is properly installed in cylindrical bore 6a having slide pawls 31 axially slidably engaged with the cylindrical inner surface of annular groove 30. It is now to be noted that under this condition, due to the biasing force of coil spring 17, the entire construction of cylindrical retainer 11' takes its uppermost position keeping valve ball 13 away from valve seat 12, as is seen from FIG. 10. Then, like in case of the above-mentioned first embodiment 100, press rod (23, see FIG. 7) is inserted into cylindrical retainer 11' and handled to press down valve ball 13 for formation of the concave seat portion 12b on the valve seat 12. During this pressing, conical spring 17 is kept compressed. With these steps, drain valve device 7 is properly assembled and set in cylindrical bore 6a, as is seen from FIG. 10.

When, as is seen from FIG. 11, filter element 4 is put in housing proper (2, see FIG. 1) and tightly retained by lid member (3) in the above-mentioned manner, bottom surface 4a of filter element 4 presses down cylindrical projected portion 19 of the retainer 11' against the biasing force of coil spring 17. With this, valve ball 13 is put on seat portion 12b of valve seat 12 with the aid of biasing force of conical spring 22. Thus, drain bore 12a is blocked by valve ball 13. Once valve ball 13 contacts seat portion 12b, downward movement of cylindrical projected portion 19 compresses conical spring 22 thereby to increase the biasing force of the spring 22 that is applied to valve ball 13. Thus, sealing function of valve ball 13 to seat portion 12b is assuredly made. This means that the lubrication oil in housing proper (2) is assuredly prevented from leaking into drain passage 6.

When, now, due to need of changing of filter element 4 with a new one, lid member (3) is removed from housing proper 2, filter element 4 is lifted by a certain degree by the force of coil spring 17 through cylindrical projected member 15, as is seen from FIG. 10. During this lifting, slide pawls 31 of the projected member 15 slide upward on the cylindrical inner wall of annular groove 30. Because coil spring 17 has been compressed largely, the lifting of filter element 4 brings about an instant separation of valve ball 13 from seat portion 12b of valve seat 12. That is, even when valve ball 13 has been attached to seat portion 12b by a certain adhesive force possessed by a deteriorated lubrication oil, valve ball 13 can be instantly detached from valve seat 12 by the greater biasing force of coil spring 17. Thus, drain passage 6 is instantly opened and remaining oil in housing proper (2) is instantly drained through the open drain passage 6.

Figure 12:
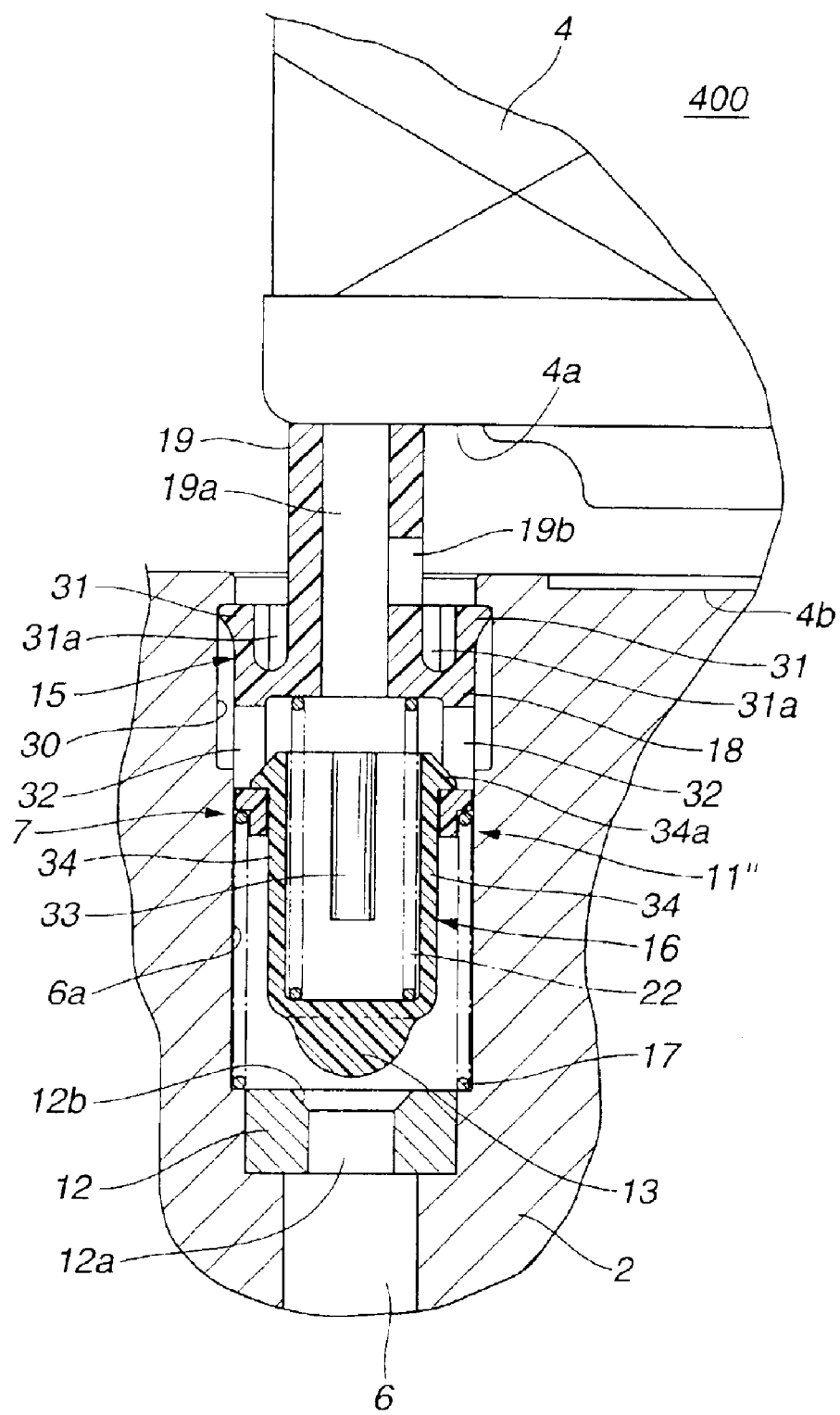
FIG. 12 is a view similar to FIG. 3, but showing a drain valve device employed in a fourth embodiment of the present invention.
Figure 13:
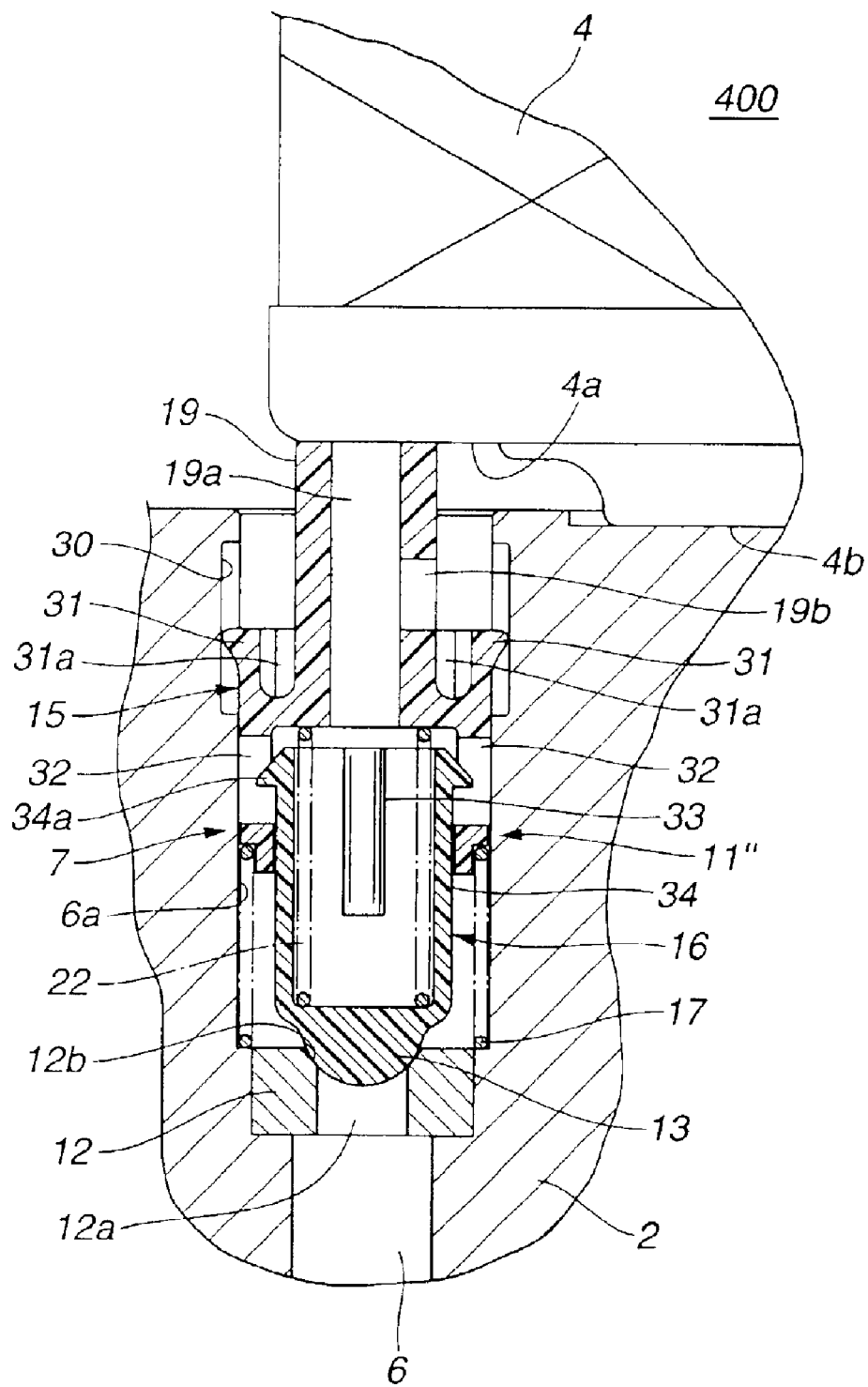
FIG. 13 is a view similar to FIG. 12, but showing a condition wherein a filter element is properly set in a filter housing.

Referring to FIGS. 12 and 13, there is shown but partially an oil filter unit 400 which is a fourth embodiment of the present invention.

Since this embodiment 400 is similar to the above-mentioned third embodiment 300, only parts or portions that are different from those of third embodiment 300 will be described in detail in the following.

That is, in this fourth embodiment 400, means acting as the valve ball 13 is integral with cylindrical base member 16 of cylindrical retainer 11". That is, valve ball means 13 is constructed of a plastic. As shown, valve ball means 13 is a hemispheric portion that projects downward from a bottom wall of cylindrical base member 16. A coil spring 22' is used in place of conical spring 22 of the third embodiment 300, that biases the valve ball means 13 toward seat portion 12b of valve seat 12.

It is to be noted that in this fourth embodiment 400, seat portion 12b of valve seat 12 is produced through a different method. That is, before being set in the bottom of cylindrical bore 6a, valve seat 12 may be treated to have such concave seat portion 12b by a known method.

As is seen from FIG. 13, when filter element 4 is properly set in housing proper (2), coil spring 22' is compressed through cylindrical projected member 15 thereby to press valve ball means 13 against seat portion 12b. While, as is seen from FIG. 12, when filter element 4 is lifted upon removal of lid member (3, see FIG. 1) from housing proper (2), valve ball means 13 is detached from seat portion 12b by greater biasing force produced by the other coil spring 17.

In the first and second embodiments 100 and 200, description is so made that cylindrical projected member 15 and cylindrical base member 16 of the cylindrical retainer 11 are made of a metal. However, if desired, like in the third and fourth embodiments 300 and 400, such two members 15 and 16 may be constructed of a plastic. In this case, reduction in weight is achieved in the drain valve device 7 and thus in the oil filter unit. Furthermore, due to the nature of plastics, the drain valve device 7 can be produced at a lower cost.

In the following, features of the present invention will be briefly described with respect to the four embodiments 100, 200, 300 and 400.

In all of embodiments 100, 200, 300 and 400, coil spring 17 (or first spring) is employed that produces a biasing force for detaching valve ball or valve ball means 13 from valve seat 12. The coil spring 17 is arranged to produce a greater biasing force when compressed due to seating of filter element 4 on cylindrical projected member 15 of cylindrical retainer 11, 11' or 11". Thus, when, upon removal of lid member 3 (see FIG. 1) from housing proper 2, filter element 4 becomes free, valve ball or valve ball means 13 is instantly detached from valve seat 12 due to the greater biasing force of spring 17, as is seen from FIGS. 3, 10 and 12. This quick release action of valve ball or valve ball means 13 from valve seat 12 brings about a quick draining of degraded lubrication oil from the oil filter unit to the outside of the same.

In first, third and fourth embodiments 100, 300 and 400, two springs 17 and 22 (or first and second springs) are employed as the parts of the drain valve device 7. Spring 17 functions to produce a biasing force for detaching valve ball or valve ball means 13 from valve seat 12, while, spring 22 functions to produce a biasing force for pressing valve ball or valve ball means 13 against valve seat 12. As is described hereinabove, spring 17 has a spring constant that is greater than that of spring 22. In other words, when, as is seen from FIGS. 5, 9, 11 and 13, drain valve device 7 is forced to assume its closed condition because of seating of filter element 4 on cylindrical projected member 15 of cylindrical retainer 11, 11' or 11", the biasing force produced or stored by spring 17 is much greater than that produced by the biasing force of the other spring 22 that is applied to valve ball or valve ball means 13. Thus, when filter element 4 becomes free due to removal of lid member 3 from housing proper 2, valve ball or valve ball means 13 is instantly detached from valve seat 12. As valve ball or valve ball means 13 is applied with only a small biasing force from spring 22, it can be produced of a material that is low in mechanical strength. It is now to be noted that the biasing force produced by second spring 22 has substantially no influence on the upward movement of retainer 11, 11' and 11" caused by first spring 17. This is different from the case of the above-mentioned known drain valve device of the oil filter unit disclosed in Laid Open Japanese Patent Application (Tokkaihei) 2-2805. In other words, in the present invention, a quite strong spring can be used as first spring 17 taking no account of the biasing force produced by second spring 22. With such strong spring, detaching action of valve ball or valve ball means 13 from valve seat 12 is much instantly achieved.

In all of embodiments 100, 200, 300 and 400, cylindrical retainer 11, 11' or 11" has a so-called split construction including cylindrical projected member 15 that is slidably held in cylindrical bore 6a and cylindrical base member 16 that holds valve ball or valve ball means 13. This split construction brings about an easy and time-saved assembling process for drain valve device 7.

In first and second embodiments 100 and 200, the two members 15 and 16 are tightly coupled, while, in third and fourth embodiments 300 and 400, such two members 15 and 16 are separated from each other. If these two members 15 and 16 are constructed of a plastic like in third and fourth embodiments 300 and 400, reduction in weight and easy production of the drain valve device 7 are achieved, which brings about light weight and low cost production of the oil filter unit.

In third and fourth embodiments 300 and 400, coupling of the two members 15 and 16 is achieved in a snap action manner. That is, by thrusting engaging hooks 34a (see FIG. 10) of cylindrical base member 16 into the lower open end of cylindrical projected member 15, the two members 15 and 16 are easily coupled. In other words, these two members 15 and 16 can be readily coupled without usage of troublesome coupling steps.

In third and fourth embodiments 300 and 400, cylindrical bore 6a is formed with annular groove 30 in which the base portion of cylindrical projected member 15 is slidably received through slide pawls 31. In other words, the base portion of cylindrical projected member 15 is slidably supported by two diametrically different cylindrical walls, one being the cylindrical inner wall of annular groove 30 and the other being the cylindrical inner wall of cylindrical bore 6a. Thus, upward and downward sliding of cylindrical projected member 15 is smoothly made, which brings about a reliable function of drain valve device 7. Furthermore, in these third and fourth embodiments 300 and 400, the two members 15 and 16 are constructed of a plastic. Reduction in weight and easy production of the valve device 7 are obtained.

In second embodiment 200, there is no means that corresponds to second spring 22. That is, in this second embodiment 200, valve ball 13 is hermetically seated on seat valve 12 by its own weight and weight of lubrication oil located above valve ball 13. In this embodiment, cost of oil filter unit can be reduced due to reduction of parts.

In all of embodiments 100, 200, 300 and 400, concave seat portion 12b is formed on valve seat 12, which assures a tight sealing of valve ball or valve ball means 13 relative to valve seat 12 because of a neat mating effected therebetween.

In all of embodiments 100, 200, 300 and 400, the hardness of valve ball or valve ball means 13 is sufficiently higher than that of valve seat 12. Thus, in first, second and third embodiments 100, 200 and 300, concave seat portion 12b (see FIG. 7) of valve seat 12 can be conveniently produced by press rod 23 in the above-mentioned manner.

In first and second embodiments 100 and 200, cylindrical base member 16 of retainer 11 is formed thereabout with an annular recess (see FIG. 5) in which first spring 17 is neatly received. Thus, the spring 17 can keep its right posture even when retainer 11 moves upward or downward in cylindrical bore 6a.

In first and second embodiments 100 and 200, there is provided annular stopper 14 at the upper end of cylindrical bore 6a. Thus, upward movement of cylindrical retainer 11 is assuredly restricted by the stopper 14. The stopper 14 is formed with center opening 14a through which cylindrical projected portion 19 of retainer 11 projects upward. Thus, upward and downward movement of retainer 11 is smoothly guided by the opening 14a.

In third and fourth embodiments 300 and 400, an upper end of annular groove 30 (see FIG. 10) constitutes a stopper means for cylindrical projected member 15. As is seen from this drawing, due to provision of such stopper means, upward movement of the member 15 is assuredly restricted.

In all of embodiments 100, 200, 300 and 400, many oil openings or slits 19b, 21b and 33 are formed in retainer 11, 11' or 11". Thus, once drain valve device 7 takes the open position, remaining oil in housing proper 2 can be instantly drained to the outside of the oil filter unit.

In all of embodiments 100, 200, 300 and 400, first spring 17 is kept deeply compressed when filter element 4 is properly set in housing proper 2 by lid member 3, as is understood from FIGS. 4 and 5. Under this condition, a greater upward biasing force is kept applied to filter element 4. Thus, once lid member 3 is turned in an unfastening direction, such unfastening turning is readily made. Furthermore, due to such greater biasing force of spring 17, filter element 4 can be instantly displaced from its set position upon removal of lid member 3, which facilitates a manual work with which filter element 4 is removed from housing proper 2.

The entire contents of Japanese Patent Applications 2002-33396 filed Feb. 12, 2002 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An oil filter unit comprising:
   a filter housing comprising:
      a housing proper; and
      a lid member;
   a filter element received in the filter housing;
   a drain passage defined by the filter housing and connected with an interior of the filter housing; and
   a drain valve device that opens and closes the drain passage in response to detachment and attachment of the lid member from and to the housing proper, the drain valve device comprising:
      a valve seat provided in the drain passage and having a drain bore formed therethrough;
      a retainer installed in the drain passage and axially movable in the same, the retainer having an oil flow passage formed therethrough;
      a valve member installed in the retainer, the valve member being movable to contact with the valve seat to close the drain bore;
      a first biasing member that biases the retainer away from the valve seat;
      a structure that causes, upon attachment of the lid member to the housing proper, the retainer to move toward the valve seat thereby to induce a contact of the valve member with the valve seat due to an input force applied from the lid member against the biasing force of the first biasing member and causes, upon detachment of the lid member from the housing proper, the retainer to move away from the valve seat thereby to induce a separation of the valve member from the valve seat due to the biasing force of the first biasing member; and
      a second biasing member that biases the valve member toward the valve seat, wherein the second biasing member is arranged to produce a biasing force that is smaller than that produced by the first biasing member.

2. An oil filter unit as claimed in claim 1, in which the housing proper is formed at its bottom portion with a cylindrical bore that forms part of the drain passage, in which the retainer is of a split structure comprising a supported member supported in the cylindrical bore and a supporting member supporting the valve member, in which the supported member is formed at an end thereof with a first engaging portion, and in which the supporting member is formed at an end thereof with a second engaging portion that is resiliently engaged with the first engaging portion.

3. An oil filter unit as claimed in claim 2, in which the cylindrical bore of the bottom portion of the housing proper is formed with an engaging groove, and in which the supported member is formed with an engaging portion that is slidably and resiliently engaged with an inner wall of the engaging groove.

4. An oil filter unit as claimed in claim 3, in which the first and second engaging portions are constructed to permit a relative axial movement between the supported supporting members.

5. An oil filter unit as claimed in claim 4, in which the valve member is integrally formed on a leading end of the supporting member.

6. An oil filter unit as claimed in claim 1, in which an inlet portion of the drain bore of the valve seat to which the valve member is contactable is tapered.

7. An oil filter unit as claimed in claim 1, in which the valve member is spherical in shape.

8. An oil filter unit as claimed in claim 1, in which the hardness of the valve member is higher than that of the valve seat.

9. An oil filter unit as claimed in claim 1, in which the housing proper is formed at its bottom portion with a cylindrical bore that forms part of the drain passage and slidably receives the retainer, and in which the retainer is formed at its outer surface with a guide portion that slidably contacts an inner wall of the cylindrical bore.

10. An oil filter unit as claimed in claim 1, in which the retainer is formed with a projected portion that receives the input force when the lid member is attached to the housing member.

11. An oil filter unit as claimed in claim 1, in which the retainer is formed about its outer surface with a stepped portion for seating thereon one end of the first biasing member.

12. An oil filter unit as claimed in claim 1, in which the housing proper is formed at its bottom portion with a cylindrical bore that forms part of the drain passage and slidably receives the retainer, and in which the cylindrical bore is provided with a stopper member that restricts an upper movement of the retainer in the cylindrical bore.

13. An oil filter unit as claimed in claim 12, in which the stopper member is formed with a center opening through which a cylindrical projected portion possessed by the retainer is received, and in which a diameter of the center opening is slightly larger than an outer diameter of the projected portion, so that the movement of the projected portion slidably guided by the center opening.

14. An oil filter unit as claimed in claim 13, in which the second biasing member is a coil spring that has an inner diameter that is larger than the center opening of the stopper member.

15. An oil filter unit as claimed in claim 1, in which the retainer is of a split structure including first and second members which are coupled to each other.

16. An oil filter unit as claimed in claim 1, in which the structure is so arranged as to press the retainer toward the seat valve through the filter element when the lid member is attached to the housing proper.

17. An oil filter unit as claimed in claim 1, wherein the retainer is formed with a tool inserting through bore through which a press rod is insertable for pushing the valve member toward the valve seat.

* * * * *